US012025957B2

(12) United States Patent
Yamaguchi

(10) Patent No.: US 12,025,957 B2
(45) Date of Patent: Jul. 2, 2024

(54) METHOD FOR CONTROLLING ELECTRONIC WATCH AND ELECTRONIC WATCH

(71) Applicant: Seiko Epson Corporation, Tokyo (JP)

(72) Inventor: Eiichiro Yamaguchi, Matsumoto (JP)

(73) Assignee: SEIKO EPSON CORPORATION

( * ) Notice: Subject to any disclaimer, the term of this patent is extended or adjusted under 35 U.S.C. 154(b) by 282 days.

(21) Appl. No.: 16/893,611

(22) Filed: Jun. 5, 2020

(65) Prior Publication Data

US 2020/0387117 A1 Dec. 10, 2020

(30) Foreign Application Priority Data

Jun. 7, 2019 (JP) ................................ 2019-106708

(51) Int. Cl.

| | |
|---|---|
| ***G04C 3/10*** | (2006.01) |
| ***G04B 19/04*** | (2006.01) |
| ***G04B 47/06*** | (2006.01) |
| ***G04C 3/14*** | (2006.01) |
| ***G04F 8/00*** | (2006.01) |

(52) U.S. Cl.
CPC ............ *G04F 8/006* (2013.01); *G04B 19/04* (2013.01); *G04B 47/066* (2013.01); *G04C 3/146* (2013.01)

(58) Field of Classification Search
CPC ....... G04B 19/04; G04B 47/066; G04F 8/006; G04C 3/146; G04C 3/10; A63B 2244/203; G01L 9/00
See application file for complete search history.

(56) References Cited

U.S. PATENT DOCUMENTS

| | | | | |
|---|---|---|---|---|
| 4,236,240 | A | 11/1980 | Yoshida | |
| 5,519,671 | A | 5/1996 | Murakami et al. | |
| 5,984,485 | A | 11/1999 | Poli et al. | |
| 6,821,014 | B2 | 11/2004 | Hiranuma et al. | |
| 7,242,639 | B2 * | 7/2007 | Blondeau | G04G 21/02 73/714 |
| 7,623,415 | B2 * | 11/2009 | Raeber | G04C 17/00 368/80 |
| 7,889,602 | B2 * | 2/2011 | Behling | G04C 17/0066 368/10 |
| 2003/0016315 | A1 | 1/2003 | Ueno et al. | |
| 2003/0174585 | A1 * | 9/2003 | Igarashi | G04G 19/12 368/66 |

(Continued)

FOREIGN PATENT DOCUMENTS

| | | |
|---|---|---|
| CN | 1190201 a | 8/1998 |
| EP | 1870786 a1 | 12/2007 |

(Continued)

*Primary Examiner* — Sean Kayes
(74) *Attorney, Agent, or Firm* — Harness, Dickey & Pierce, P.L.C.

(57) ABSTRACT

A method for controlling an electronic watch that includes a first pointing hand, a first motor configured to move the first pointing hand, a second pointing hand, a second motor configured to move the second pointing hand, and a pressure sensor configured to measure a pressure, the method including, when start of diving is detected based on a pressure measured by the pressure sensor, controlling the first motor and the second motor, and indicating with the first pointing hand and the second pointing hand a water depth based on the pressure and a diving time period.

13 Claims, 11 Drawing Sheets

(56) References Cited

U.S. PATENT DOCUMENTS

| | | | |
|---|---|---|---|
| 2004/0047242 | A1 | 3/2004 | Germiquet et al. |
| 2004/0125585 | A1 | 7/2004 | Sung |
| 2007/0025186 | A1 | 2/2007 | Gilomen |
| 2007/0068245 | A1 * | 3/2007 | Blondeau ................. G01C 5/06 73/179 |
| 2007/0183264 | A1 * | 8/2007 | Raeber ................... G04G 21/02 368/11 |
| 2009/0015514 | A1 | 1/2009 | Suzuki et al. |
| 2009/0154296 | A1 * | 6/2009 | Behling ............... G04B 19/247 368/10 |
| 2009/0185451 | A1 * | 7/2009 | Rochat ................. G04B 47/066 368/11 |
| 2009/0185452 | A1 | 7/2009 | Veuthey et al. |
| 2013/0051192 | A1 | 2/2013 | Oshio |
| 2018/0081406 | A1 | 3/2018 | Kita et al. |
| 2021/0131638 | A1 | 5/2021 | Sato et al. |
| 2022/0107074 | A1 | 4/2022 | Sato et al. |

FOREIGN PATENT DOCUMENTS

| | | | |
|---|---|---|---|
| GB | 2280049 | A | 1/1995 |
| JP | H06-186355 | A | 7/1994 |
| JP | H07-020266 | A | 1/1995 |
| JP | H07-077585 | A | 3/1995 |
| JP | H07-218656 | A | 8/1995 |
| JP | 2000-111661 | A | 4/2000 |
| JP | 2002-012190 | A | 1/2002 |
| JP | 2002-181960 | A | 6/2002 |
| JP | 3329817 | B2 | 9/2002 |
| JP | 2003-194968 | A | 7/2003 |
| JP | 2004-101525 | A | 4/2004 |
| JP | 2006-275948 | A | 10/2006 |
| JP | 2007-286075 | A | 11/2007 |
| JP | 2009-156868 | A | 7/2009 |
| JP | 3203279 | U | 3/2016 |
| JP | 2016-170399 | A | 9/2016 |
| WO | 2006-103965 | A1 | 10/2006 |
| WO | 2018-021456 | A1 | 2/2018 |
| WO | 2019-245030 | a1 | 12/2019 |

* cited by examiner

METHOD FOR CONTROLLING ELECTRONIC WATCH AND ELECTRONIC WATCH

The present application is based on, and claims priority from JP Application Serial Number 2019-106708, filed Jun. 7, 2019, the disclosure of which is hereby incorporated by reference herein in its entirety.

BACKGROUND

1. Technical Field

The present disclosure relates to a method for controlling an electronic watch, and an electronic watch.

2. Related Art

As described in JP-A-2003-194968, many of diver's watches are each installed with a rotating bezel for a checking diving time period. A diver wearing a diver's watch rotates a rotating bezel at start of diving, to align a graduation of "0" of the rotating bezel with time of the start of diving, usually, with a minute hand. The diver can check a diving time period by reading a graduation of the rotating bezel pointed by the minute hand indicating current time, during diving.

For a diver's watch in the past with which a diving time period is measured by rotating a rotating bezel, a user needs to rotate the rotating bezel to align a graduation at start of diving. Accordingly, when the user forgets a rotating operation, or a shift in position of a graduation occurs due to erroneous operation of a rotating operation, a diving time period cannot be accurately indicated in some cases.

SUMMARY

A method for controlling an electronic watch according to the present disclosure is a method for controlling an electronic watch that includes a first pointing hand, a first motor configured to move the first pointing hand, a second pointing hand, a second motor configured to move the second pointing hand, and a pressure sensor configured to measure a pressure, the method including, when start of diving is detected based on a pressure measured by the pressure sensor, controlling the first motor and the second motor, and indicating with the first pointing hand and the second pointing hand a water depth based on the pressure and a diving time period.

An electronic watch according to the present disclosure includes a first pointing hand, a first motor configured to move the first pointing hand, a second pointing hand, a second motor configured to move the second pointing hand, a first motor driving circuit configured to drive the first motor, a second motor driving circuit configured to drive the second motor, a pressure sensor configured to measure a pressure, an environment estimation unit configured to estimate a water depth based on a pressure measured by the pressure sensor thereby detecting start of diving, a diving time timing unit configured to start timing of a diving time period when the environment estimation unit detects the start of diving, and a hand position controlling unit configured to control the first motor and the second motor by the first motor driving circuit and the second motor driving circuit respectively, and indicate with the first pointing hand and the second pointing hand a water depth estimated by the environment estimation unit and a diving time period timed by the diving time timing unit.

In the electronic watch according to the present disclosure, it is preferable that the electronic watch include a water detection sensor, and when detecting that the electronic watch entered water by the water detection sensor, start pressure measurement by the pressure sensor.

In the electronic watch according to the present disclosure, it is preferable that when the water depth estimated by the environment estimation unit reaches or exceeds a predetermined value, the diving time timing unit start timing of a diving time period.

In the electronic watch according to the present disclosure, it is preferable that the hand position controlling unit, when the diving time timing unit starts timing of diving time period, move one of of the first pointing hand and the second pointing hand that indicates a diving time period to a 12 o'clock position, and move the one of the pointing hands in association with the timing of the diving time period.

In the electronic watch according to the present disclosure, it is preferable that a third pointing hand, a third motor configured to move the third pointing hand, and a third motor driving circuit configured to drive the third motor be included, the first pointing hand be an hour hand, the second pointing hand be a minute hand, and the third pointing hand be a seconds hand, and the hand position controlling unit, when the diving time timing unit starts timing of a diving time period, indicate the water depth and the diving time period with the first pointing hand and the second pointing hand, and indicate seconds of current time with the third pointing hand.

In the electronic watch according to the present disclosure, it is preferable that a third pointing hand, a third motor configured to move the third pointing hand, and a third motor driving circuit configured to drive the third motor be included, the first pointing hand be an hour hand, the second pointing hand be a minute hand, and the third pointing hand be a seconds hand, and the hand position controlling unit, when the diving time timing unit starts timing of a diving time period, indicate the water depth and the diving time period with the first pointing hand and the second pointing hand, and indicate seconds of the diving time period with the third pointing hand.

In the electronic watch according to the present disclosure, it is preferable that a fourth pointing hand, a fourth motor configured to drive the fourth pointing hand, and a fourth motor driving circuit configured to drive the fourth motor be included, and the hand position controlling unit, when the environment estimation unit detects the start of diving, move the fourth pointing hand to a position indicating a diving mode, and when the environment estimation unit detects the start of diving, indicate a battery residual amount with the fourth pointing hand.

The electronic watch according to the present disclosure may include a digital display unit configured to indicate that a diving mode is set, when the environment estimation unit detects the start of diving.

In the electronic watch according to the present disclosure, it is preferable that an operation unit operable by a user be provided, and the hand position controlling unit be configured to, when detection is made that the operation unit is operated while the diving time period is indicated, indicate current time with the first pointing hand and the second pointing hand, and after a certain amount of time elapses after indicating the current time, indicate the water depth and the diving time period using the first pointing hand and the second pointing hand.

In the electronic watch according to the present disclosure, it is preferable that an operation unit operable by a user be provided, the hand position controlling unit be configured to, when detection is made that the operating unit is operated while the diving time period is indicated, indicate a maximum water depth with one of the first pointing hand and the second pointing hand, and indicate a current water depth with the other of of the first pointing hand and the second pointing hand.

In the electronic watch according to the present disclosure, it is preferable that an operation unit operable by a user be provided, the hand position controlling unit is configured to, in a case in which a maximum water depth is indicated with one of the first pointing hand and the second pointing hand, and a current water depth is indicated with the other of the first pointing hand and the second pointing hand, and when detection is made that the operation unit is operated, indicate current time with the first pointing hand and the second pointing hand.

In the electronic watch according to the present disclosure, it is preferable that the first pointing hand be an hour hand and the second pointing hand be a minute hand, and the first pointing hand indicate the water depth and the second pointing hand indicate the diving time period.

DESCRIPTION OF EXEMPLARY EMBODIMENTS

First Embodiment

Figure 1:
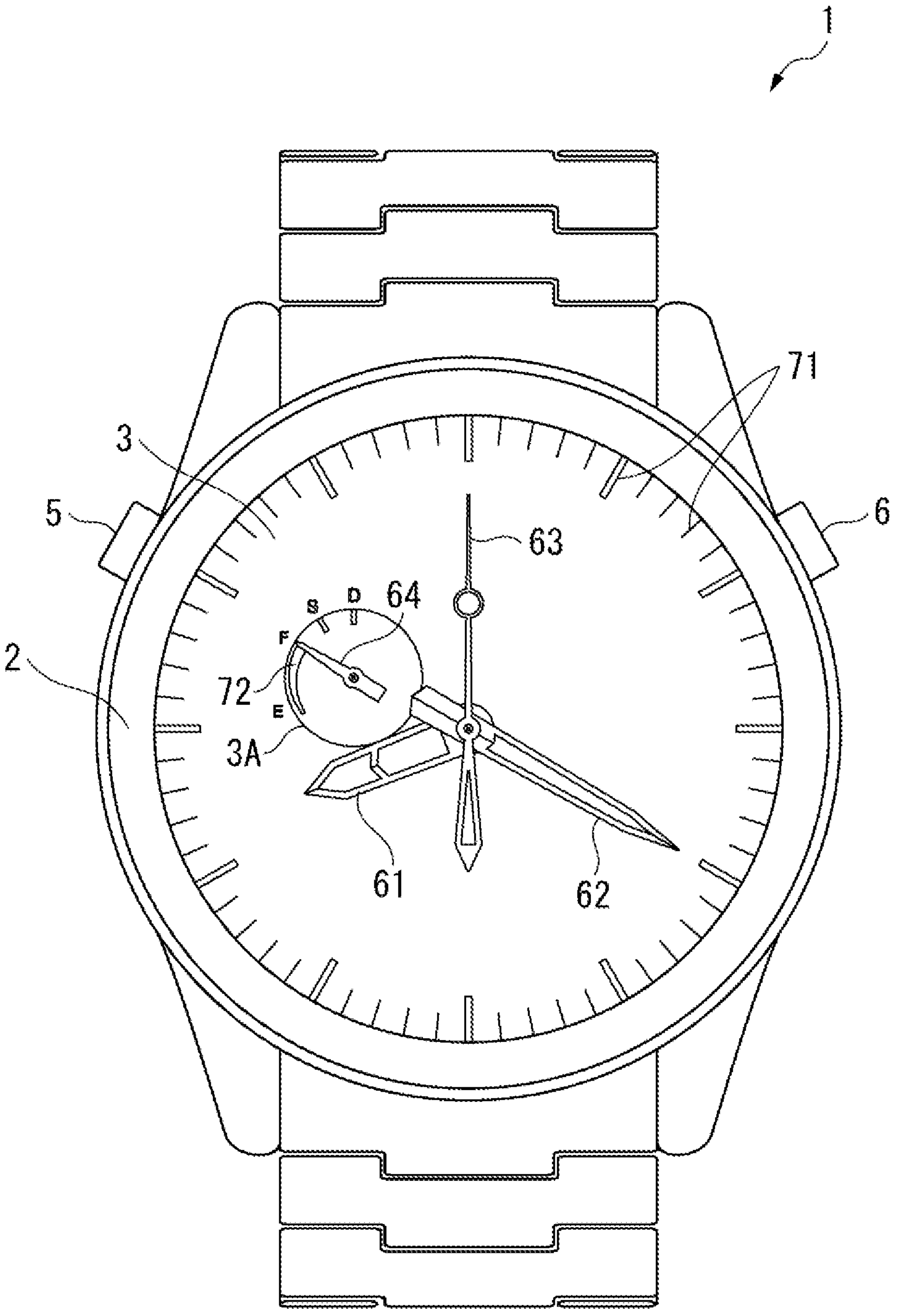
FIG. 1 is a front view illustrating an electronic watch according to a first embodiment.

FIG. 1 is a front view illustrating an electronic watch 1 according to a first embodiment.

The electronic watch 1 is a diver's quartz watch worn on a user's wrist, and includes an outer packaging case 2, a cover glass, and a case back. A dial 3, a movement 10 illustrated in FIG. 2, and pointing hands 60 driven by the movement 10 are provided in the outer packaging case 2. Further, an A button 5 and a B button 6 as operating units are provided on a side surface of the outer packaging case 2.

Figure 2:
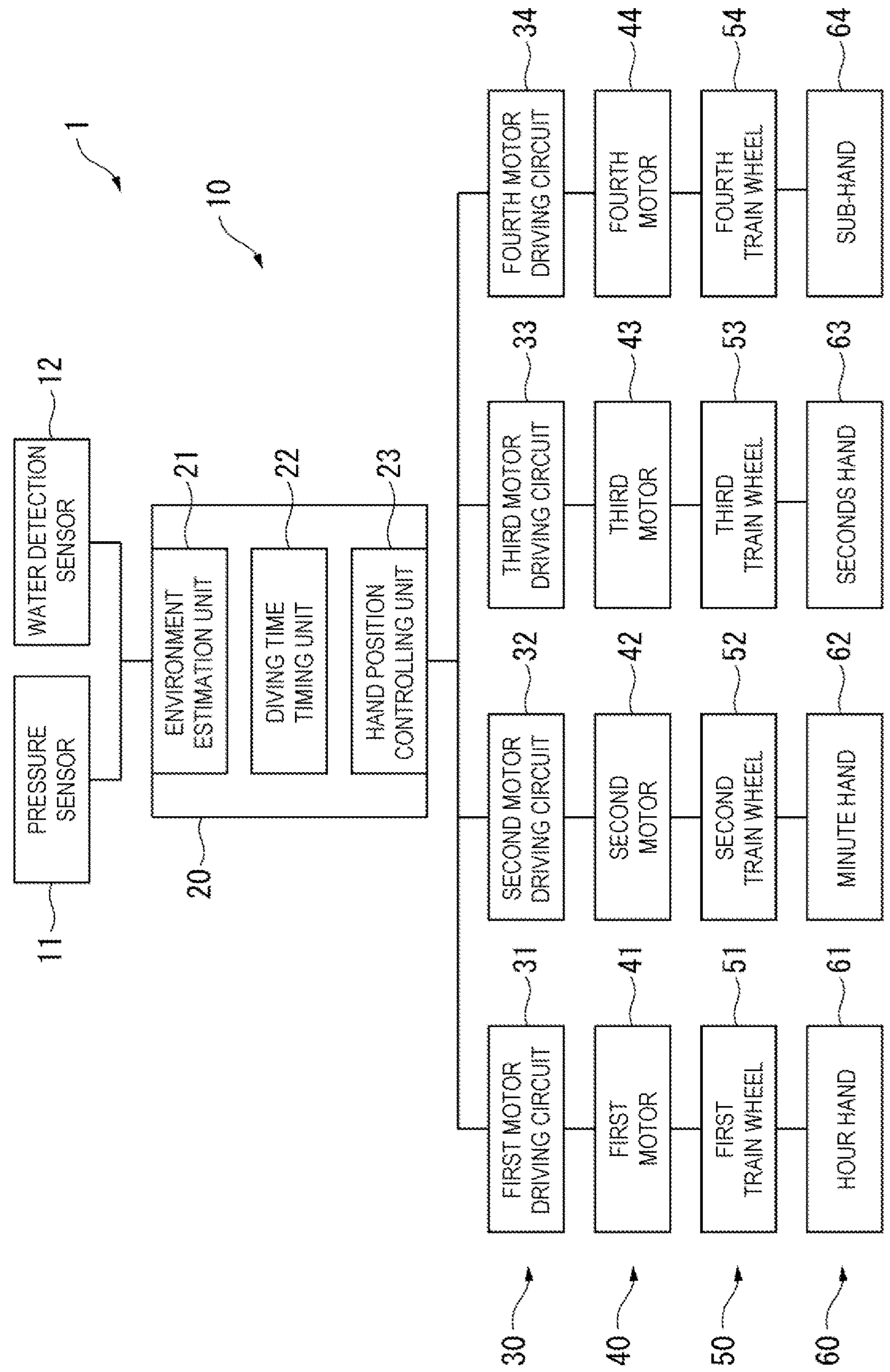
FIG. 2 is a block diagram illustrating a configuration of the electronic watch.

FIG. 2 is a block diagram illustrating a main configuration of the movement 10.

The movement 10 includes a pressure sensor 11, a water detection sensor 12, a control device 20, motor driving circuits 30, motors 40, and train wheels 50. Also, although not illustrated, an oscillator using a crystal oscillator, a battery serving as a power source, and the like are also provided in the movement 10.

The pressure sensor 11 is a sensor that measures a pressure applied to the electronic watch 1 and outputs the pressure to the control device 20, and a pressure sensor generally used for a diver's watch can be utilized.

The water detection sensor 12 is a sensor that conducts when water comes into contact with the water detection sensor 12, and detects that the electronic watch 1 enters into water or exits from water.

The control device 20 is constituted by a Micro Controller Unit, abbreviated as an MCU, and includes an environment estimation unit 21, a diving time timing unit 22, and a hand position controlling unit 23.

The environment estimation unit 21 is a processing unit for estimating, based on a measurement value of the pressure sensor 11, whether diving is in progress or not, and a depth or a water depth thereof in a case that diving is in progress. The environment estimation unit 21, when a detection signal based on which it can be determined that the electronic watch 1 enters into water is inputted from the water detection sensor 12, activates the pressure sensor 11 to measure pressure. While the pressure sensor 11 is activated, the environment estimation unit 21 performs pressure measurement at a predetermined time interval, for example, every one second.

The environment estimation unit 21 determines that start of diving occurs, when a measurement value of the pressure sensor 11 exceeds a predetermined value corresponding to a preset water depth. In the electronic watch 1 according to the present embodiment, as described below, as a diving mode, a snorkeling mode in which diving is performed at a relatively shallow water depth, or a diver mode in which diving is performed to a deeper water depth than that in the snorkeling mode can be selected. Thus, as the predetermined value for determining start of diving, a threshold value of a water depth 50 cm is set in the snorkeling mode, and a threshold value of a water depth 1.5 m is set in the diver mode.

When detecting that the electronic watch 1 exits from water by the water detection sensor 12, the environment estimation unit 21 stops the pressure sensor 11. The environment estimation unit 21, when detecting that the electronic watch 1 enters into water again by the water detection sensor 12, activates the pressure sensor 11 again, and when detecting that the electronic watch 1 exits from water, stops the pressure sensor 11 again.

The diving time timing unit 22 times elapsed time from a point of time when the environment estimation unit 21 determines that start of diving occurs, that is, diving time. The diving time timing unit 22 can be implemented, for example, by a counter for counting a reference signal outputted from an oscillator.

The hand position controlling unit 23 is a processing unit that receives instructions for indicating various pieces of diving information such as a water depth estimated by the environment estimation unit 21, and diving time timed by the diving time timing unit 22, from a hand position for indicating the diving information with a pointing hand, and a hand position of each pointing hand at the time point, calculates a difference or amount of travel of the pointing hand, and outputs a drive command to the motor driving circuits 30. In the present embodiment, since four pointing hands, that is, an hour hand 61, a minute hand 62, a seconds hand 63, and a sub-hand 64 are included, the hand position controlling unit 23 controls movement of each the pointing hand.

The motor driving circuits 30 are common driving circuits that supply drive currents to coils of the motors 40 to drive the motors 40, respectively. In the present embodiment, the motor driving circuits 30 include a first motor driving circuit 31, a second motor driving circuit 32, a third motor driving circuit 33, and a fourth motor driving circuit 34.

The motors 40 are stepping motors used for a watch, and in the present embodiment, include a first motor 41, a second motor 42, a third motor 43, and a fourth motor 44.

The train wheel 50 conveys a rotational force of a rotor of the motor 40 to move the pointing hand, and in the present embodiment, a first train wheel 51 driven by the first motor 41, a second train wheel 52 driven by the second motor 42, a third train wheel 53 driven by the third motor 43, and a fourth train wheel 54 driven by the fourth motor 44 are included.

The pointing hands 60 include the hour hand 61 that is a first pointing hand moved by the first motor 41 and the first train wheel 51, the minute hand 62 that is a second pointing hand moved by the second motor 42 and the second train wheel 52, the seconds hand 63 that is a third pointing hand moved by the third motor 43 and the third train wheel 53, and the sub-hand 64 that is a fourth pointing hand moved by the fourth motor 44 and the fourth train wheel 54.

As illustrated in FIG. 1, the hour hand 61, the minute hand 62, and the seconds hand 63 are central hands that are attached to three pointing hand shafts respectively that are provided so as to penetrate the dial 3 and are provided at a planar central position of the dial 3.

The sub-hand 64 is provided at a position of a sub-dial 3A provided in a 10 o'clock direction with respect to the planar central position of the dial 3.

Graduations 71 are provided on an outer periphery of the dial 3 and disposed so as to divide the outer periphery into 60 equal parts from a 12 o'clock position of the dial 3. In the following description, the graduation 71 positioned at 12 o'clock is referred to as the graduation 71 of "0-minutes", and subsequently, the graduations 71 arranged clockwise are expressed as the graduations 71 of "1-minute" to "59-minutes" respectively.

A battery residual amount gauge 72 and a graduation S and a graduation D each indicating the diving mode are provided on an outer periphery of the sub-dial 3A. The sub-hand 64, in a normal mode in which current time is indicated with the hour hand 61, the minute hand 62, and the seconds hand 63, points the battery residual amount gauge 72, and in the diving mode, points the graduation S or the graduation D. Thus, the sub-hand 64 and the sub-dial 3A function as a mode indication unit for indicating an operating mode of the electronic watch 1.

In the battery residual amount gauge 72, F stands for Full, indicating a state in which a battery residual amount is large, that is, a battery voltage level is high, and E stands for Empty, indicating a state in which a battery residual amount is small.

The graduation S is a graduation indicating, in the diving mode, a mode when diving is performed at a relatively shallow water depth such as in snorkeling or skin diving.

The graduation D is a graduation indicating, in the diving mode, a mode when diving is performed at a relatively deeper water depth, such as in diving, than that in skin diving or the like.

Hereinafter, the state in which the sub-hand 64 points the graduation S is referred to a snorkeling mode or S mode, and the state in which the sub-hand 64 points the graduation D is referred to a diver mode or D mode.

A difference between these diving modes is, when a water depth is indicated with a pointing hand, that water depth ranges that can be indicated are different from each other.

For example, when description is given by using a case as an example in which the hour hand 61 indicates a water depth, in the S mode, a water depth indicated by one graduation or a graduation of one minute is 10 cm, thus, when the hour hand 61 circles once or rotates 360° from the graduation positioned at 12 o'clock or the graduation 71 of 0-minutes, water depths from a water depth 0 cm to a water depth 600 cm or water depth 6 m can be indicated.

On the other hand, in the D mode, a water depth indicated by one graduation or a graduation of one minute is 1 m, and when the hour hand 61 circles once or rotates 360° from the graduation 71 of 0-minutes, water depths from the water depth 0 m to a water depth 60 m can be indicated.

In the S mode, when the water depth 6 m is exceeded, the mode automatically transits to the D mode, the hand position controlling unit 23 points the graduation D with the sub-hand 64, and the hour hand 61 points a position of the water depth 6 m or the graduation 71 of six-minutes.

In the D mode, when the water depth 60 m is exceeded, that is, after the hour hand 61 circles once as well, the hand position controlling unit 23 continues to control in which the hour hand 61 points the next graduation 71 indicating one minute every time water depth increases by 1 m. Thus, when the hour hand 61 points the graduation 71 of five-minutes, for example, it is not distinguishable only with the hour hand 61 whether the hour hand 61 is at first circling and points 5 m or is at second circling and points 65 m. Thus, a configuration is adopted in which, when the hour hand 61 is at the second circling, or the water depth is 60 m or greater, by reciprocally moving the sub-hand 64 in a fixed range, the user can grasp that the hour hand 61 indicates a water depth in the second circling. Note that, instead of reciprocally moving the sub-hand 64 in a fixed range, a configuration may also be adopted in which, a graduation "D2" indicating second circling on the sub-dial 3A is newly provided, and this graduation is pointed by the sub-hand 64.

Additionally, a configuration may also be adopted in which, by causing the electronic watch 1 to vibrate, to make a sound, or to light a light emitting diode provided, a fact that the hour hand 61 is at the second circling is indicated.

In addition, in the S mode, even in a case in which a configuration is adopted in which when a water depth exceeds the water depth 6 m, the mode does not transit to the D mode, and remains in the S mode to indicate a water depth, as in the D mode, it is sufficient that a water depth is indicated by reciprocally moving the sub-hand 64, or newly providing a graduation "S2" on the sub-dial 3A. This allows the user to determine whether a water depth is the water depth 50 cm or a water depth 650 cm when the hour hand 61 points the graduation 71 of five-minutes.

Furthermore, it is sufficient to similarly address even in a case in which the hour hand 61 may circle three or more times.

Next, a control method for the electronic watch 1 during diving will be described.

The control device 20 of the electronic watch 1 controls, before the electronic watch 1 enters into water, via the motor driving circuits 30, the first motor 41, the second motor 42, and the third motor 43, and performs a normal mode in step S1, in which current time is indicated with the hour hand 61, the minute hand 62, and the seconds hand 63.

The control device 20 performs step S2 while the normal mode is performed to determine whether a battery voltage V exceeds a first threshold value V1 or not. When determining No in step S2, the control device 20 continues the determination process in step S2. The determination in step S2 is performed because, when the pressure sensor 11 or the water detection sensor 12 is operated or a diving mode described later is performed at a low level of battery voltage, the control device 20 stops due to a decrease in battery voltage, and it may not be possible to provide diving information such as a water depth and diving time to the user. In the case of NO in step S2, the user can grasp that the battery voltage is low because the normal mode remains after the electronic watch 1 enters into water, and can address by battery replacement, battery charging, or the like.

When YES is determined in step S2, the environment estimation unit 21 of the control device 20 performs a process in step S3 for powering on the water detection sensor 12. Note that, until a diving mode in step S30 described below is performed, the time indication with the hour hand 61, the minute hand 62, and the seconds hand 63 is continuously performed.

The environment estimation unit 21 performs a determination process in step S4 of whether or not entrance into water is detected, by the water detection sensor 12 that is operated. When determining NO in step S4, the control device 20 performs a process in step S5 to determine whether the battery voltage V lowers to be equal to or smaller than the first threshold value V1.

When determining YES in step S5, the control device 20 performs a process in step S6 for powering off the water detection sensor 12 by the environment estimation unit 21, and returns the mode to the normal mode in step S1.

When NO is determined in step S5, the environment estimation unit 21 continues the determination process in step S4.

When YES is determined in step S4, the environment estimation unit 21 performs step S7 for powering on the pressure sensor 11 to start operation. The pressure sensor 11, until the water detection sensor 12 detects exit from water, that is, detects that the electronic watch 1 is taken out of water, measures pressure or water pressure at a predetermined time interval, for example, at one second interval.

Next, the control device 20 performs a pre-diving mode in step S10. The pre-diving mode is a mode that is performed when entrance into water is detected by the water detection sensor 12, and determines whether a condition is satisfied for transition to the diving mode or not.

A reason for setting this pre-diving mode is as follows.

For example, even when the user wearing the electronic watch 1 on an arm puts the arm wearing the electronic watch 1 into water, while playing at a river, or the like, the water detection sensor 12 detects entrance into water. Accordingly, when the mode transits to the diving mode due to only detection of entrance into water, unnecessary processing such as timing of diving time or the like is performed.

On the other hand, it is also conceivable to set such that the normal mode is maintained when entrance into water is detected, and, when a water pressure measured by the pressure sensor 11 satisfies a predetermined water depth condition, the normal mode transits to the diving mode. In this case, even when diving is actually performed, because the normal mode does not switch to the diving mode in a state of a shallow water depth, the user may erroneously recognize that the electronic watch 1 is out of order.

Thus, in the electronic watch 1 according to the present embodiment, a configuration is adopted in which the mode does not immediately transit to the diving mode upon detection of entrance into water, once transits to the pre-diving mode, and when a water pressure measured by the pressure sensor 11 satisfies a predetermined water depth condition, transits to the diving mode to start timing of diving time.

Pre-Diving Mode

Figure 4:
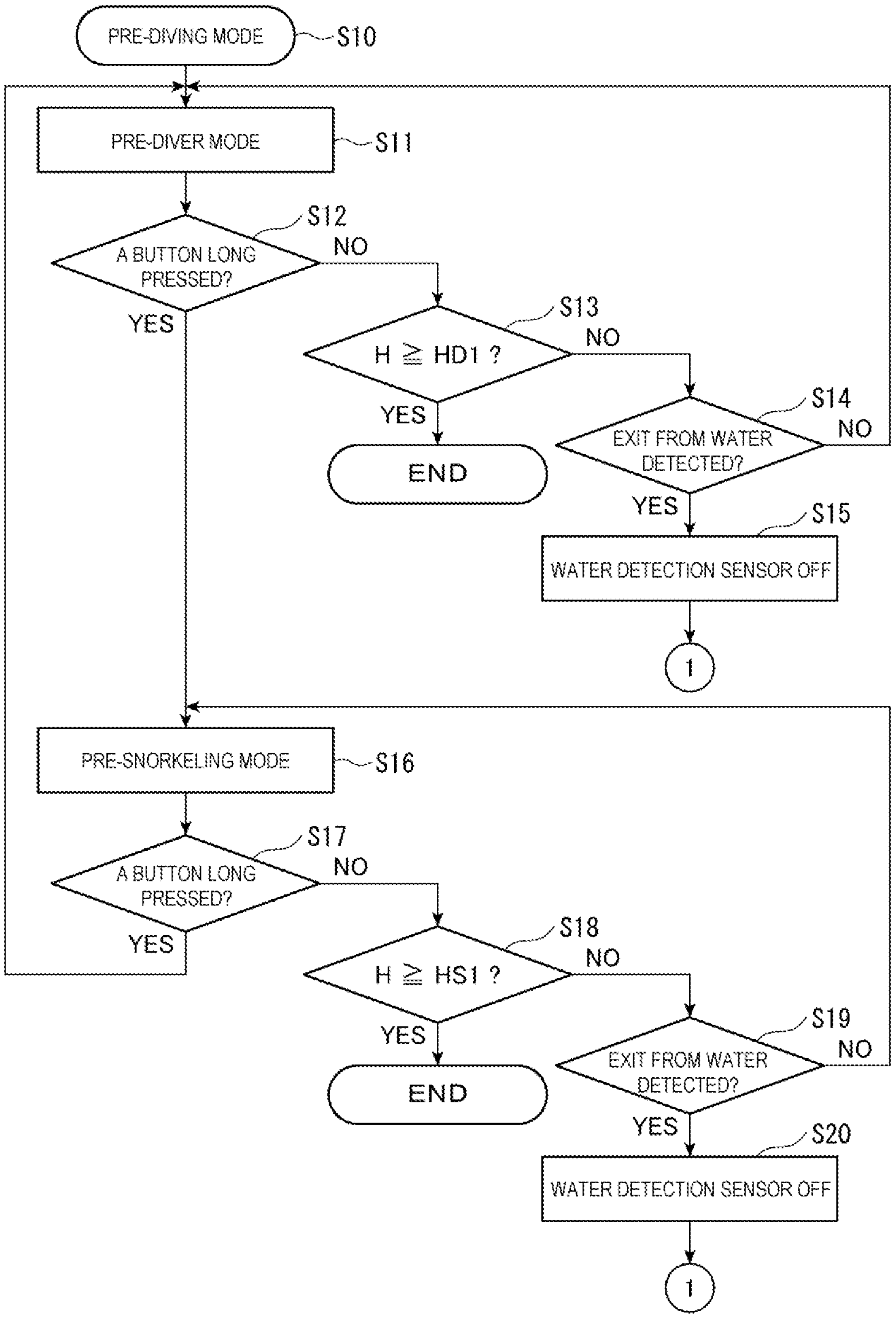
FIG. 4 is a flowchart illustrating processing in a pre-diving mode.

Processing in the pre-diving mode will be described based on a flowchart in FIG. 4.

Pre-Diver Mode

Figure 5:
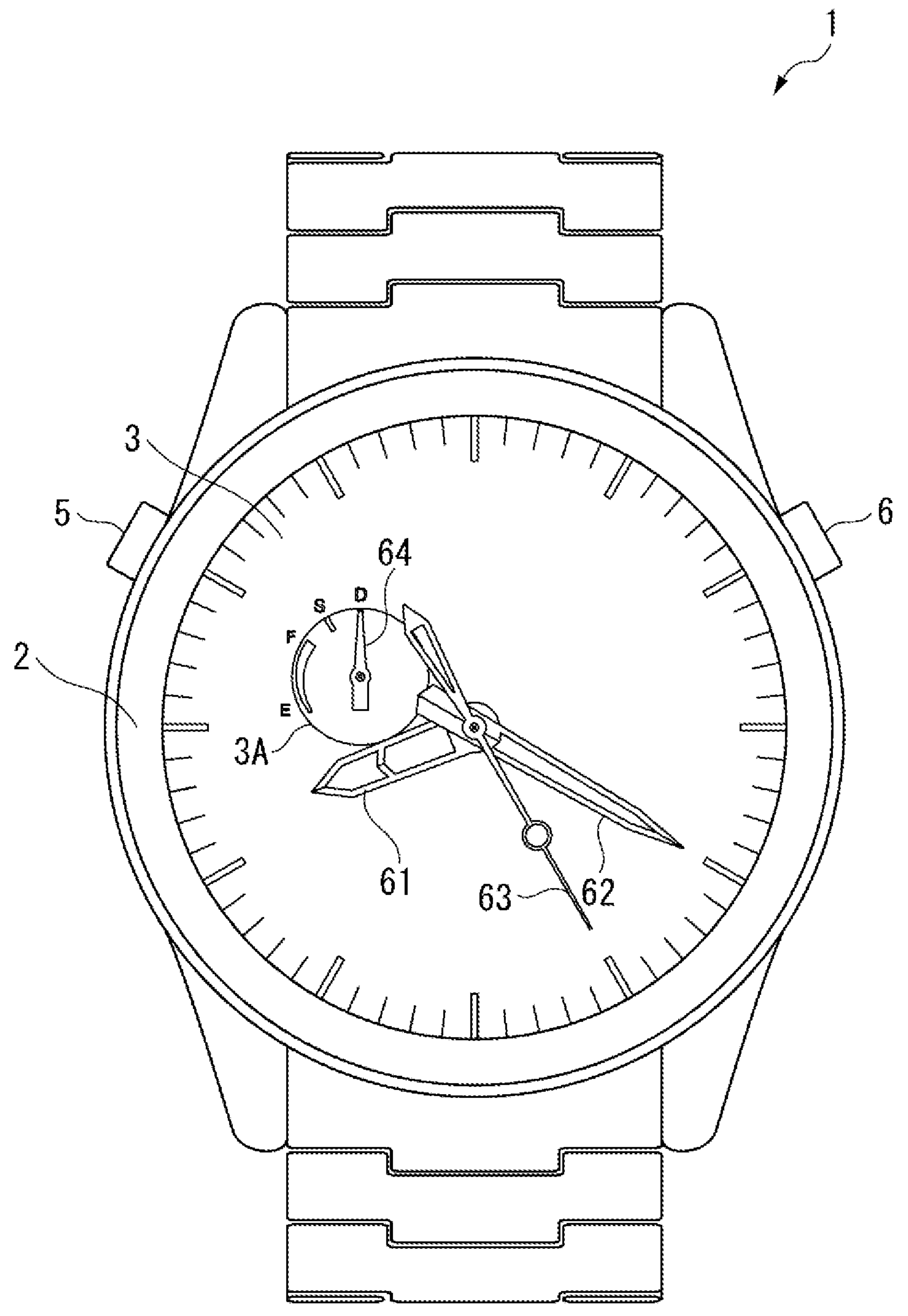
FIG. 5 is a front view illustrating the electronic watch in a pre-diver mode.

When performing the pre-diving mode in step S10, the control device 20 performs a pre-diver mode in step S11 that is initial setting. In step S11, the hand position controlling unit 23, as illustrated in FIG. 5, continues time indication with the hour hand 61, the minute hand 62, and the seconds hand 63, controls the fourth motor 44 via the fourth motor driving circuit 34, and points the graduation D with the sub-hand 64.

The control device 20 performs step S12 for determining whether or not the A button 5 is long pressed, for example, for three seconds or longer.

When the control device 20 determines NO in step S12, the environment estimation unit 21 performs step S13 for determining whether or not a water depth H estimated based on a water pressure measured by the pressure sensor 11 reaches or exceeds the threshold value HD1 that is a condition for transition to the diver mode. The threshold value HD1 is, for example, a water depth 1.5 m, but the threshold value HD1 is not limited to 1.5 m, and may be set to other values, such as 1.2 m and 2.0 m.

When the environment estimation unit 21 determines YES in step S13, the control device 20 ends the pre-diving mode in step S10, and performs the diving mode in step S30 described later, in a state in which the diver mode is set.

When determining NO in step S13, the environment estimation unit 21 performs step S14 for determining whether exit from water is detected by the water detection sensor 12 or not.

When determining YES in step S14, the environment estimation unit 21 performs a process in step S15 for powering off the water detection sensor 12, and the mode returns to the normal mode in step S1.

When the environment estimation unit 21 determines NO in step S14, the control device 20 returns the mode to the pre-diver mode in step S11.

Pre-Snorkeling Mode

When determining YES in step S12, the control device 20 performs a pre-snorkeling mode in step S16. In step S16, the hand position controlling unit 23, although illustration is omitted, continues the time indication with the hour hand 61, the minute hand 62, and the seconds hand 63, controls the fourth motor 44 via the fourth motor driving circuit 34, and points the graduation S with the sub-hand 64.

The control device 20, even while performing the pre-snorkeling mode, performs a determination process similar to that in the pre-diver mode. In other words, the control device 20 performs step S17 for determining whether the A button 5 is long pressed or not, and when NO is determined in step S17, the environment estimation unit 21 performs, based on a water pressure measured by the pressure sensor 11, step S18 for determining whether or not the water depth reaches or exceeds the threshold value HS1 that is a condition for transition to the snorkeling mode. The threshold value HS1 is, for example, the water depth 50 cm, but the threshold value HS1 is not limited to 50 cm, and may be set to other values such as 30 cm and 1.0 m.

When the environment estimation unit 21 determines YES in step S18, the control device 20 ends the pre-diving mode in step S10, and performs the diving mode in step S30 described later, in a state in which the snorkeling mode is set.

When determining NO in step S18, the environment estimation unit 21 performs step S19 for determining whether exit from water is detected by the water detection sensor 12 or not.

When determining YES in step S19, the environment estimation unit 21 performs a process in step S20 for powering off the water detection sensor 12, and the mode returns to the normal mode in step S1.

When the environment estimation unit 21 determines NO in step S19, the control device 20 returns the mode to the pre-snorkeling mode in step S16.

When determining YES in step S17, the control device 20 performs the pre-diver mode in step S11.

Thus, in the pre-diving mode, the condition for transition to the diver mode or snorkeling mode is satisfied, or exit from water is detected, the pre-diving mode transits to the other mode.

Diving Mode

Figure 3:
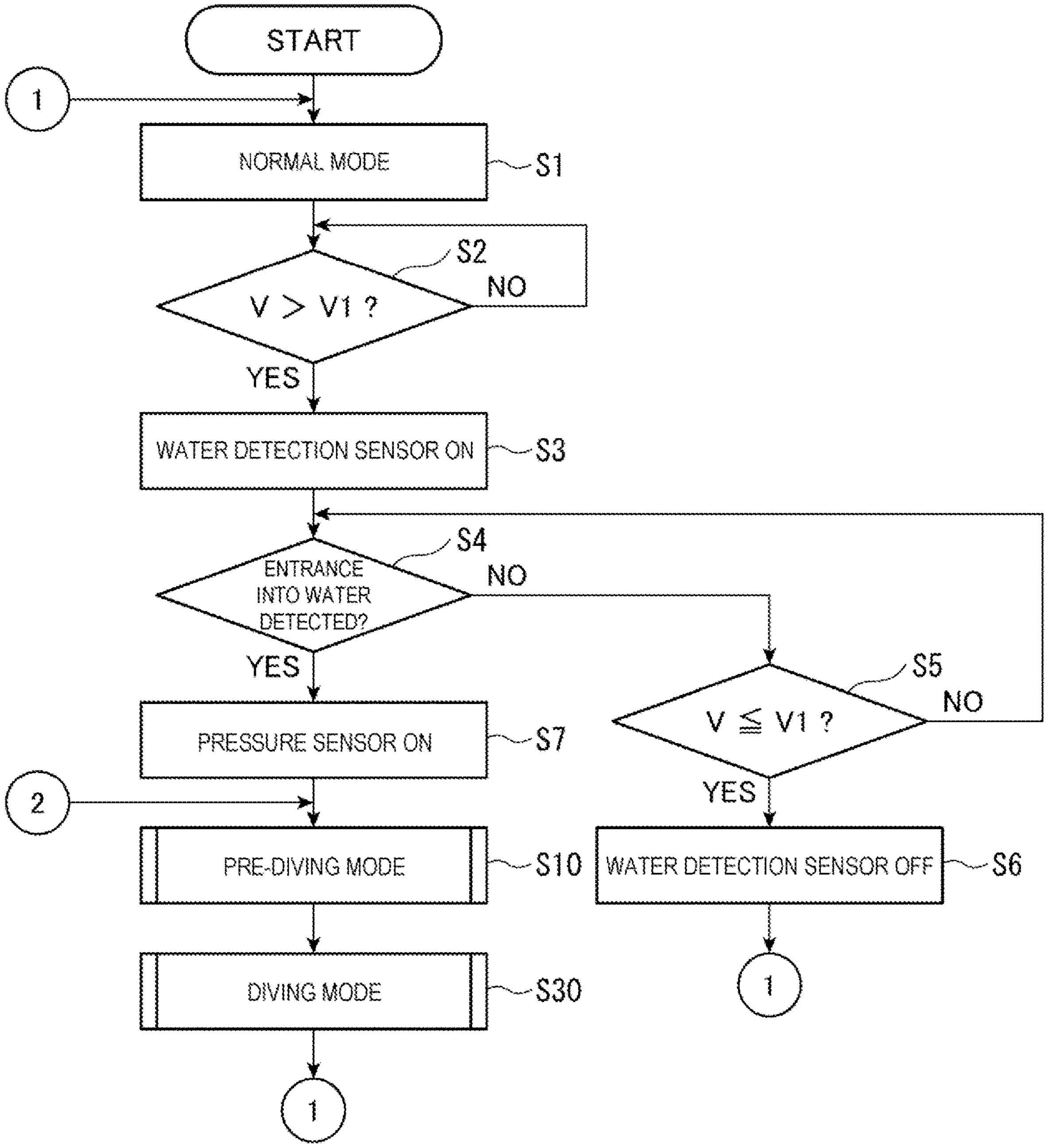
FIG. 3 is a flowchart illustrating a method for controlling the electronic watch.

When YES is determined in step S13 or S18 in the pre-diving mode, and the condition for transition to the diving mode is satisfied, the control device 20 performs the diving mode in step S30, as illustrated in FIG. 3.

Figure 6:
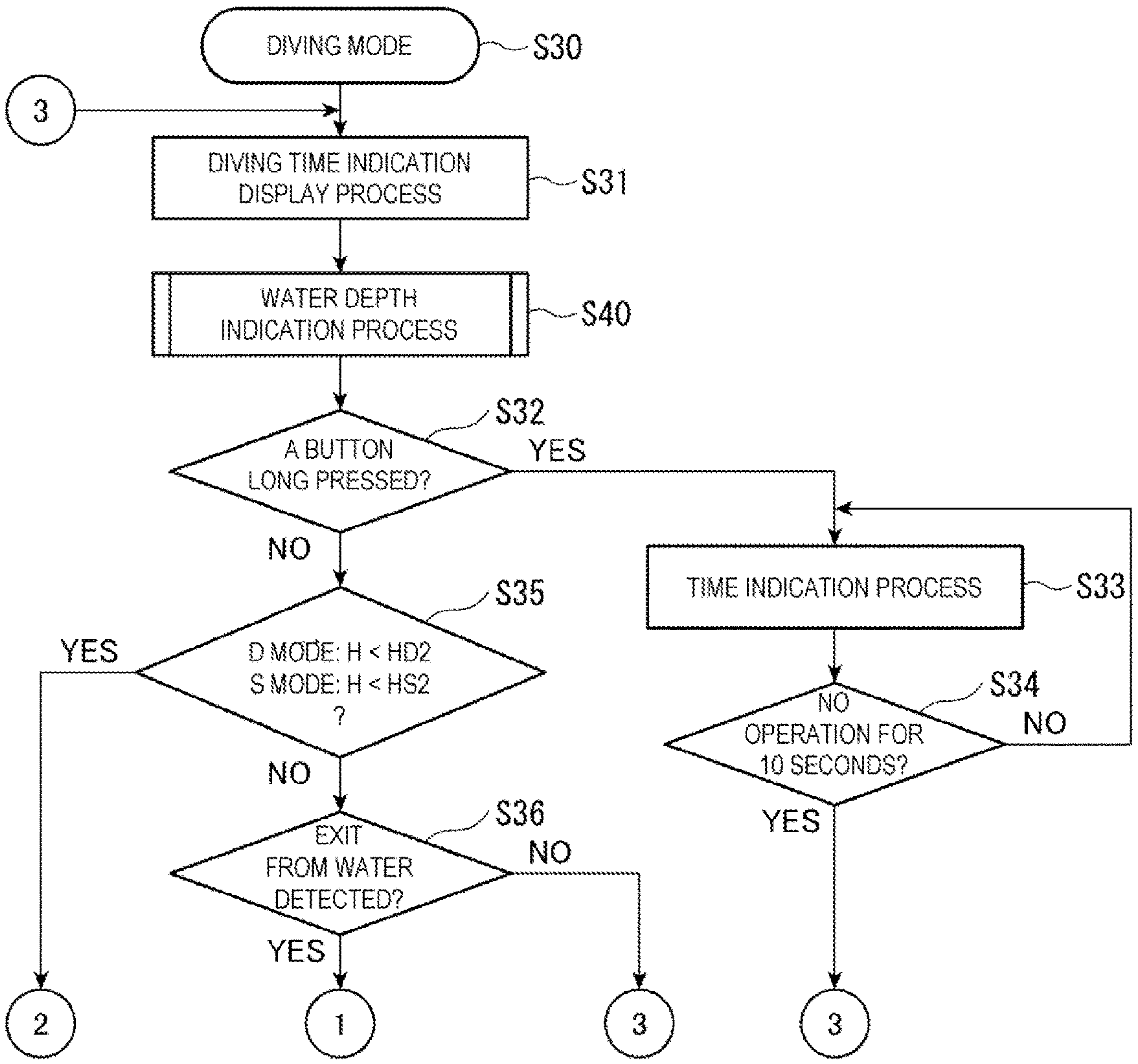
FIG. 6 is a flowchart illustrating processing in a diving mode.

When the diving mode is performed, the control device 20 performs, as illustrated in FIG. 6, a diving time indication process in step S31, and a water depth indication process in step S40 every one second.

Note that, in the pre-diving mode, the hour hand 61, the minute hand 62, and the seconds hand 63 indicate current time, thus the hand position controlling unit 23, when the diving mode starts, moves the hour hand 61, the minute hand 62, and the seconds hand 63 via the motor driving circuits 30, the motors 40, and the train wheels 50, to the 0-minutes position being an initial position, that is, a position indicating the graduation 71 of 12-o'clock.

In the diving time indication process in step S31, the diving time timing unit 22 times diving time started at the time when the mode transits to the diving mode. The hand position controlling unit 23 indicates the diving time that is timed every one second by the diving time timing unit 22, with the minute hand 62 and the seconds hand 63. At this time, the hand position controlling unit 23 causes the seconds hand 63 to rotate forward every other second, to indicate seconds of the diving time, and causes the minute hand 62 to rotate forward every five seconds, to indicate minutes of the diving time.

In addition, even when diving time exceeds one hour, the hand position controlling unit 23 continues to indicate the diving time by rotating forward the minute hand 62 and the seconds hand 63 as is. Thus, indication of the minute hand 62 and the seconds hand 63 is identical both when the diving time is 10 minutes and when the diving time is 70 minutes.

The water depth indication process in step S40 will be described with reference to FIG. 7.

The control device 20 performs step S41 for determining whether a current diving mode is the diver mode or the snorkeling mode. Note that, in FIG. 7, the diver mode is illustrated as the D mode, and the snorkeling mode is illustrated as the S mode.

When the snorkeling mode is set, the control device 20 performs step S42 for determining whether or not the water depth H based on a measurement value by the pressure sensor 11 is equal to or greater than a transition threshold value HD3 for the diver mode. In the present embodiment, the transition threshold value HD3 is 6 m, that is, in the snorkeling mode in which the hour hand 61 rotates by one graduation or 6° per 10 cm, the condition for transition to the diver mode is that the hour hand 61 circles once or rotates 360°, or that the water depth H reaches 6 m. However, the transition threshold value HD3 is not limited to 6 m, and may be set to 1.5 m at which the mode transits to the diving mode in the diver mode, may be set to between 1.5 m and 6 m, or may be set to 6 m or greater.

Figure 8:
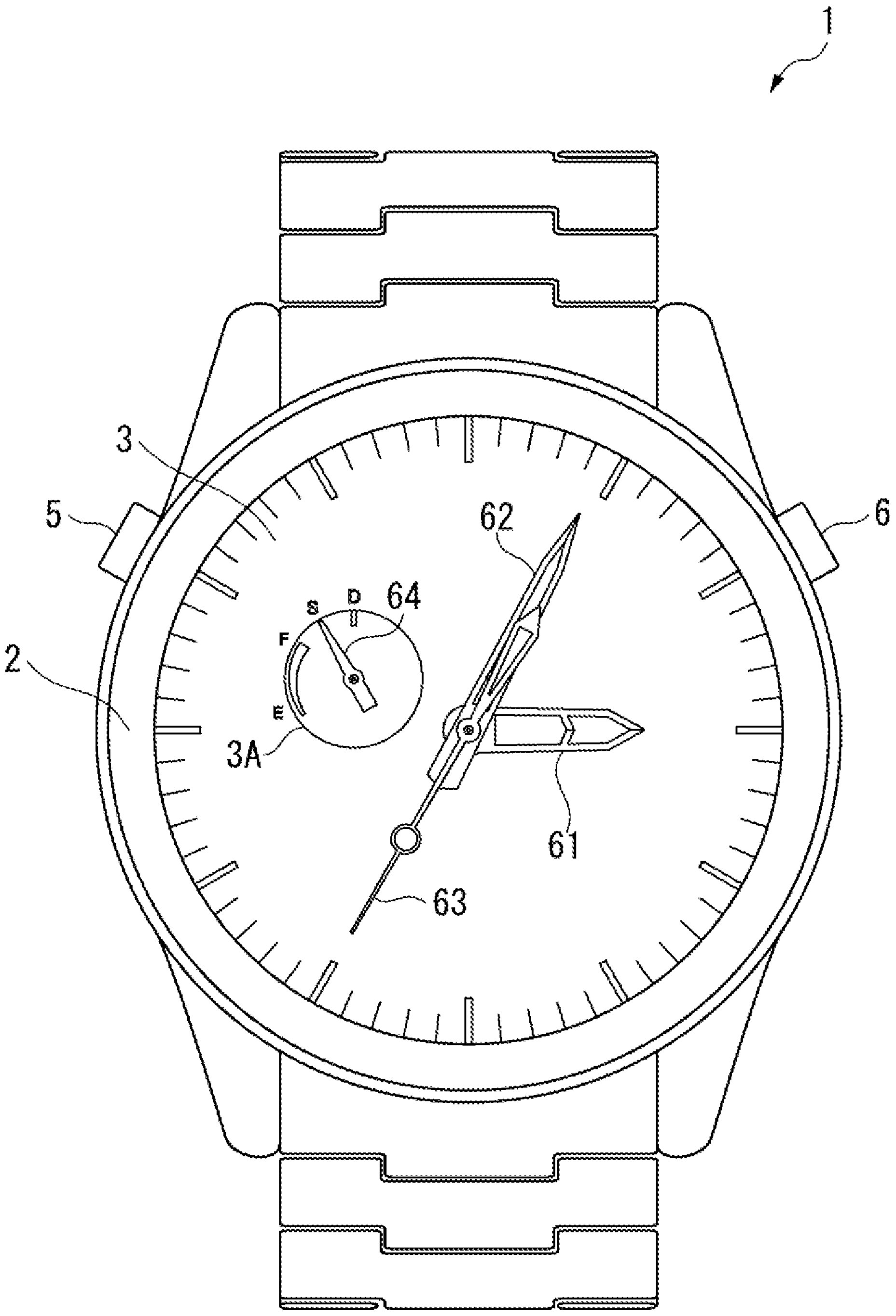
FIG. 8 is a front view illustrating the electronic watch in a snorkeling mode.

In a case of NO in step S42, the hand position controlling unit 23 performs step S43 to perform water depth indication in the snorkeling mode with the hour hand 61. In other words, the hour hand 61 is moved to a position of a water depth indicated using a scale that is 10 cm per one graduation 71 or one minute. For example, in an example illustrated in FIG. 8, the hour hand 61 points to the graduation 71 of 15-minutes, thereby indicating a water depth 150 cm. Also, in FIG. 8, diving time indicated by the minute hand 62 and the seconds hand 63 illustrates a state that 4 minutes 35 seconds elapsed.

Figure 7:
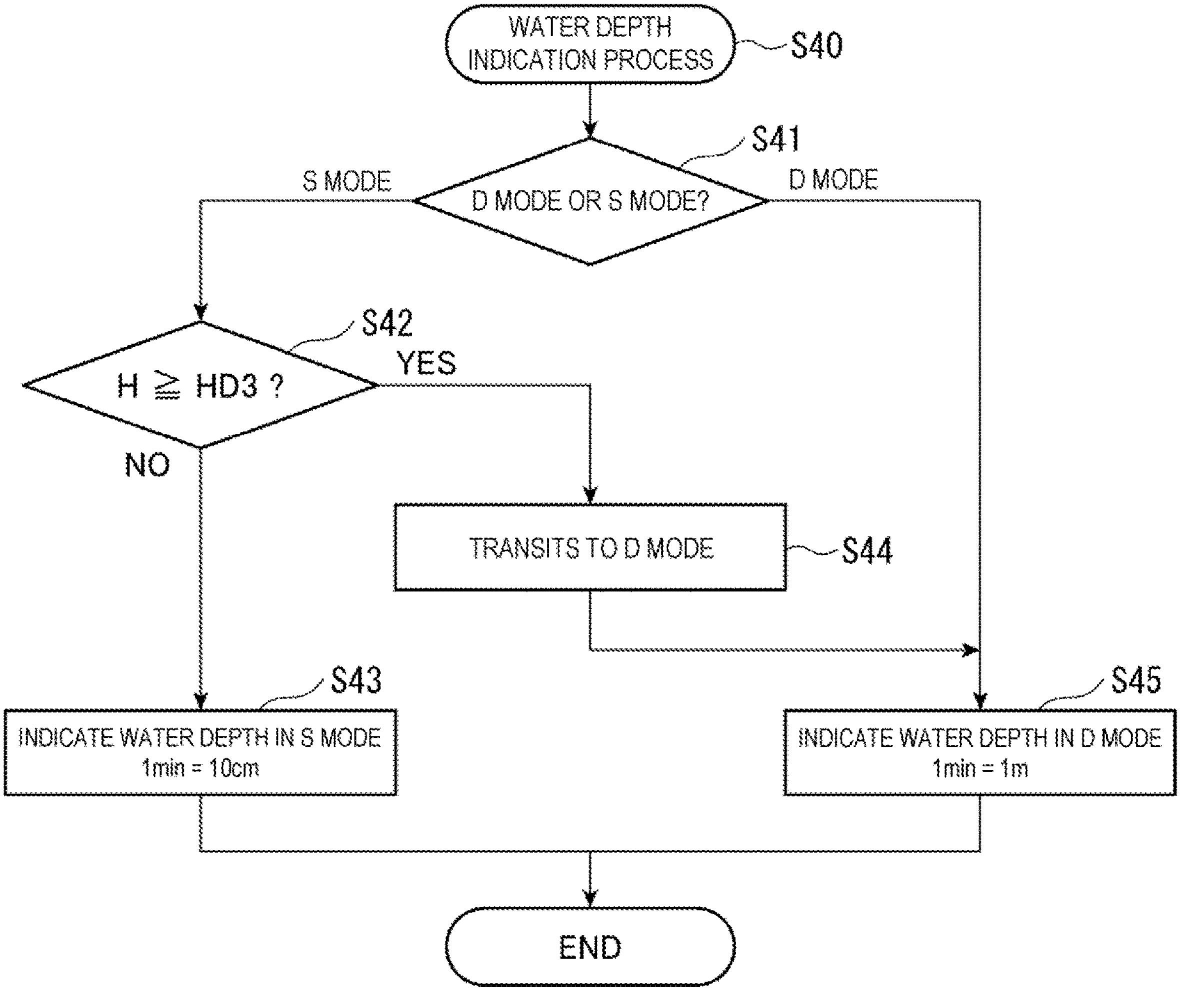
FIG. 7 is a flowchart illustrating water depth indication process.

As illustrated in FIG. 7, in a case of YES in step S42, the control device 20 performs step S44 for transiting the diving mode from the snorkeling mode to the diver mode. In this case, the hand position controlling unit 23 switches pointing by the sub-hand 64 from the graduation S to the graduation D.

Figure 9:
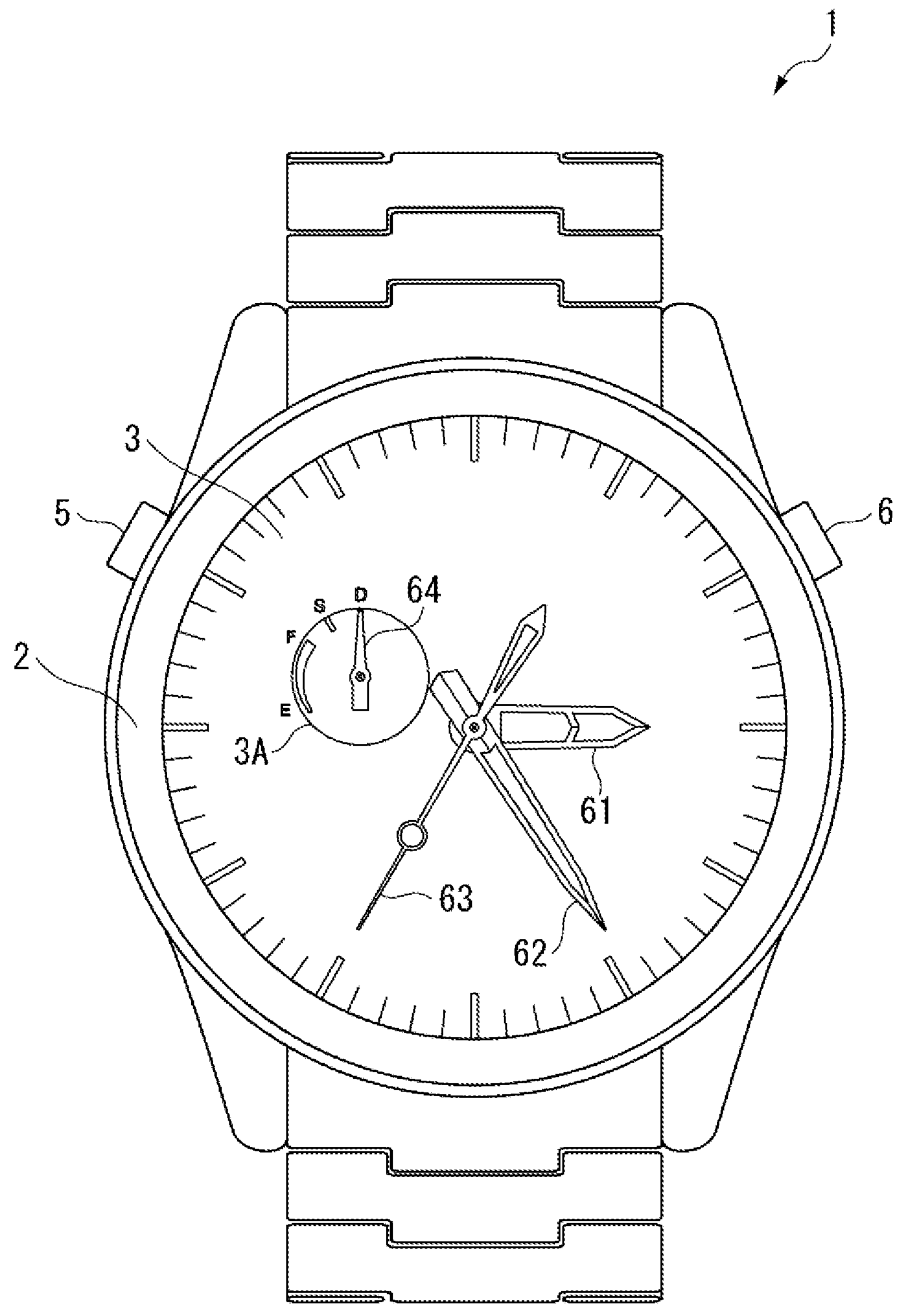
FIG. 9 is a front view illustrating the electronic watch in a diver mode.

After performing step S44 or when the diver mode is determined in step S41, the hand position controlling unit 23 performs step S45 to indicate a water depth in the diver mode with the hour hand 61. In other words, the hour hand 61 is moved to a position of a water depth indicated using a scale that is 1 m per one graduation 71. For example, in an example illustrated in FIG. 9, the hour hand 61 points the graduation 71 of 15-minutes, thereby indicating the water depth 15 m. Also, in FIG. 9, diving time indicated by the minute hand 62 and the seconds hand 63 illustrates a state that 24 minutes 35 seconds elapsed.

When a water depth is indicated with the hour hand 61 in step S43 or step S45, the hand position controlling unit 23 causes the hour hand 61 to rotate forward when a water depth this time is greater than a water depth previous time, and causes the hand 61 to rotate backward when a water depth this time is smaller than a water depth previous time. Thus, the user is in a state of gradually and deeply diving when the hour hand 61 is rotating forward, and the user is in a state of gradually rising when the hour hand 61 is rotating backward.

After a water depth is indicated with the hour hand 61 in step S43 or step S45, the control device 20 ends the water depth indication process in step S40, and performs step S32 for determining whether the A button 5 is pressed or not.

In a case of YES in step S32, the control device 20 performs a time indication process in step S33 for indicating current time with the hour hand 61, the minute hand 62, and the seconds hand 63. At this time, since the hour hand 61, the minute hand 62, and the seconds hand 63 are driven by the first motor 41, the second motor 42, and the third motor 43 independent from each other, respectively, in order to indicate current time, the pointing hands move from positions indicating a water depth and diving time, in a direction such that displacement of the pointing hands is smaller, and after the movement, move for normal time indication.

The control device 20 performs step S34 for determining whether no operation is performed after the current time indication process in step S33 is started, for a predetermined amount of time, for example 10 seconds. When determining No in step S34, the control device 20 continues the time indication process in step S33. At this time, the hand position controlling unit 23 moves the seconds hand 63 every one second, moves the minute hand 62 every five seconds, and moves the hour hand 61 every one minute.

In a case of YES in step S34, the control device 20 returns the processing to step S31 to perform the diving time indication process and the water depth indication process continuously.

In a case of NO in step S32, the control device 20 performs step S35 for determining whether or not the water depth H estimated by the environment estimation unit 21 decreases to be smaller than a predetermined threshold value. The predetermined threshold value is set in accordance with the diving mode, a threshold value HD2 is set in the diver mode illustrated as the D mode in FIG. 6, and a threshold value HS2 is set in the snorkeling mode illustrated as the S mode in FIG. 6. The threshold value HD2 may be a value identical to the threshold value HD1, for example, 1.5 m, or may be a value different from the threshold value HD1. Similarly, the threshold value HS2 may be a value identical to the threshold value HS1, for example, 50 cm, or may be a value different from the threshold value HS1.

When YES is determined in step S35, since rising is performed to a position of a shallow water depth, the control device 20 performs the pre-diving mode in step S10 illustrated in FIG. 3. When the mode transits to the pre-diving mode, the timing of the diving time by the diving time timing unit 22 ends, and the hand position controlling unit 23 indicates current time with the hour hand 61, the minute hand 62, and the seconds hand 63.

When determining NO in step S35, the control device 20 performs step S36 for determining whether exit from water is detected by the water detection sensor 12 or not.

When determining YES in step S36, the control device 20 performs the normal time indication process in step S1. When determining NO in step S36, the control device 20 returns the processing to step S31 to perform the diving time indication process and the water depth indication process.

The condition for determining detection of exit from water without performing the pre-diving mode is set for supporting a case in which, the user stands up and exits from water in a state in which the user is performing snorkeling at a shallow sea floor with a water depth of about 1 m, thus the water detection sensor 12 detects exit from water before change in water pressure is detected by the pressure sensor 11.

As explained above, in the electronic watch 1, in the normal mode in which current time is indicated with the hour hand 61, the minute hand 62, and the seconds hand 63, when entrance into water is detected, the mode transits to the pre-diving mode, and when a water depth exceeds the threshold value in the pre-diving mode, the mode transits to the diving mode. When the mode transits to the diving mode, timing of diving time is started, a water depth is indicated with the hour hand 61, and the diving time is indicated with the minute hand 62 and the seconds hand 63. When the A button 5 is long pressed during the diving mode, current time is indicated, and after a certain period of time elapses, the indication of the water depth and the diving time resumes.

In addition, when a water depth decreases to be smaller than the threshold value in the diving mode, the mode returns to the pre-diving mode, and when exit from water is detected in the pre-diving mode or the diving mode, the mode returns to the normal mode.

Advantageous Effects of First Embodiment

The electronic watch 1 includes the diving time timing unit 22 for starting timing of diving time from a point of time when the mode transits to the diving mode, and in the diving mode, the diving time timed by the diving time timing unit 22 is indicated with the minute hand 62 and seconds hand 63. Accordingly, there is no need to provide a rotating bezel, thus an operation of a rotating bezel will not be forgotten, erroneous indication of diving time will not be caused by erroneous operation, and accurate diving time can be indicated. Furthermore, necessity of a rotary bezel can be eliminated, thereby reducing constraints on design of an outer packaging, reducing the number of components, and thinning the outer packaging case 2.

The environment estimation unit 21 for estimating a water depth, based on a water pressure measured by the pressure sensor 11 is provided, and a water depth is indicated with the hour hand 61 in the diving mode, thus a water depth can also be indicated in addition to diving time.

Since the configuration is adopted in which the hour hand 61, the minute hand 62, and the seconds hand 63 can be driven independently, pointing hands for performing time indication in the normal mode can also be used as pointing hands for indicating a water depth and diving time in the diving mode. Thus, the number of pointing hands can be reduced, and design of the indication unit of the electronic watch 1 can be simplified.

In addition to the pressure sensor 11, the water detection sensor 12 is provided, and the pressure sensor 11 is operated after entrance into water is detected by the water detection sensor 12, thus power consumption can be reduced compared to when the pressure sensor 11 is constantly operated.

The diving time timing unit 22, based on a pressure measured by the pressure sensor 11, when a water depth estimated by the environment estimation unit 21 reaches or exceeds a predetermined value, specifically, reaches or exceeds the threshold value HD1 in the diver mode, or reaches or exceeds the threshold value HS1 in the snorkeling mode, starts timing of diving time. Thus, for example, in a state in which diving is not actually performed even when entrance into water is detected, such as, when the user is floating on a water surface, it is possible to prevent timing of diving time from being started, and diving time can be accurately measured.

At the start of timing of diving time, the hand position controlling unit 23 controls the minute hand 62 and the seconds hand 63 that indicate diving time to move to the 12 o'clock position, and then to indicate diving time, thus the user can intuitively and accurately grasp diving time.

Also, since minutes of diving time is indicated with the minute hand 62, and seconds of the diving time is indicated with the seconds hand 63, the user can easily check that the seconds hand 63 is operating normally, thereby easily recognizing that the electronic watch 1 is functioning normally. That is, since the seconds hand 63 moves every one second, the user can easily check abnormal movement of the hand, compared to the minute hand 62 that moves every five second, and the hour hand 61 that indicates a water depth and does not move at constant intervals. Thus, when the seconds hand 63 operates normally, it is easy for the user to recognize that the electronic watch 1 is normal.

Since the sub-hand 64 indicating a current mode is provided, the user can easily check a current mode even when each of the hour hand 61, the minute hand 62, and the seconds hand 63 is also used for another purpose. Furthermore, since the sub-hand 64 points the battery residual amount gauge 72 in the normal mode, a battery voltage can be easily grasped.

Even when the hour hand 61 indicates a water depth, and the minute hand 62 and the seconds hand 63 indicate minutes and sounds of diving time respectively, indication switches to current time when the user simply presses the A button 5, so that the user can easily check time when needed even during diving.

Furthermore, when a certain period of time elapses with no operation performed after indication is switched to time indication, the indication automatically returns to diving information, thus user convenience can be improved.

A configuration is adopted in which, as the diving mode, the diver mode or the snorkeling mode can be selected, and in each the mode, a scale of a water depth indicated by the hour hand 61 is switched, thus water depth information can be appropriately indicated in each the mode.

Modified Example of First Embodiment

In the first embodiment, the seconds hand 63 indicates seconds of diving time in the diving mode, but may continue to indicate seconds of current time. That is, in the normal mode, current time may be indicated with the hour hand 61, the minute hand 62, and the seconds hand 63, and in the diving mode, a water depth may be indicated with the hour hand 61, minutes of diving time may be indicated with the minute hand 62, and seconds of current time may be indicated with the seconds hand 63.

Because, in this case, it is not possible to check seconds of diving time, but it is sufficient that minutes of diving time can be checked in practical use, and large influence is not given to grasp of diving time even when seconds of diving time cannot be checked.

Also, even when minutes of diving time is indicated with the minute hand 62, and seconds of the diving time is indicated with the seconds hand 63, the user can easily recognize that the electronic watch 1 is functioning normally, when the seconds hand 63 continuously and normally moves.

Second Embodiment

Next, an electronic watch 1B according to a second embodiment will be described. The electronic watch 1B differs from the electronic watch 1 according to the first embodiment in a method for indicating diving time and a water depth in a diving mode. Thus, indication of diving information in the diving mode will be described below.

When the mode transits to the diving mode, according to operation of the A button 5 and the B button 6, the electronic watch 1B switches between a diving time indication mode, a water depth indication mode, and a time indication mode.

Figure 10:
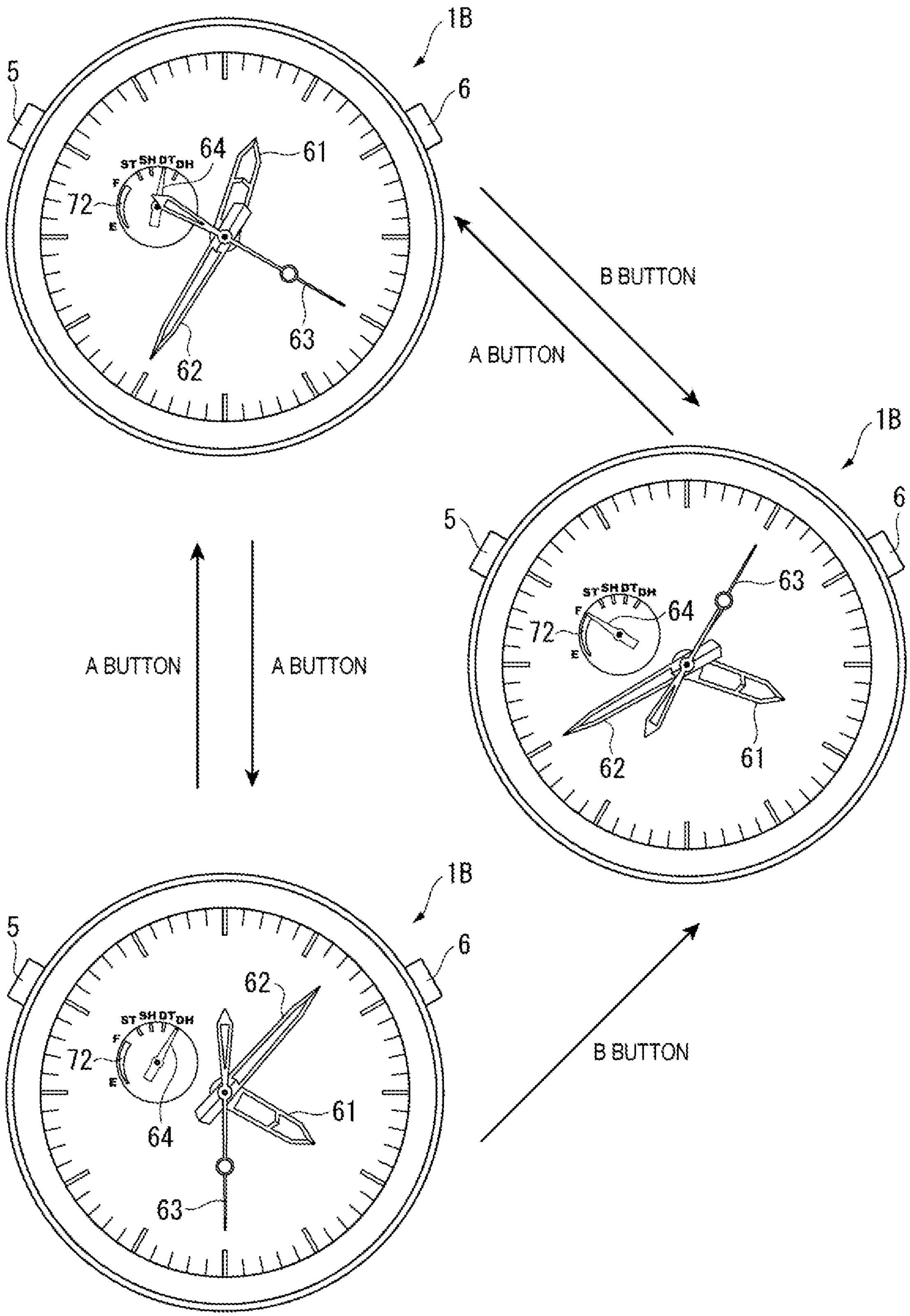
FIG. 10 is a diagram illustrating a switching state of indication modes of the electronic watch according to a second embodiment.

On a sub-dial 3B of the electronic watch 1B, as illustrated in FIG. 10, the battery residual amount gauge 72, a graduation ST indicating a diving time indication mode in a snorkeling mode, a graduation SH indicating a water depth indication mode in the snorkeling mode, a graduation DT indicating a diving time indication mode in a diver mode, and a graduation DH indicating a water depth indication mode in the diver mode are displayed.

Similar to the electronic watch 1 according to the first embodiment, when the mode transits from a pre-diving mode to the diving mode, the diving time timing unit 22 starts timing of diving time, and the hand position controlling unit 23 performs the diving time indication mode. In the diving time indication mode, as illustrated by the electronic watch 1B in at upper left in FIG. 10, the hand position controlling unit 23 points the graduation DT with the sub-hand 64, indicates hours of diving time with the hour hand 61, indicates minutes of the diving time with the minute hand 62, and indicates seconds of the diving time with the seconds hand 63.

While the diving time indication mode is performed, when the user presses the A button 5, the mode switches to the water depth indication mode, and as illustrated by the electronic watch 1B at lower left in FIG. 10, the hand position controlling unit 23 points the graduation DH with the sub-hand 64, indicates a maximum water depth with the hour hand 61, and indicates a current water depth with the minute hand 62. The seconds hand 63 continues to indicate the seconds of diving time.

Here, the maximum water depth is a largest value of water depth during current diving, that is, during a period in which after the mode transits to the diving mode, the mode passes through the diving mode, and transits to the pre-diving mode or a normal mode. However, a configuration may be adopted in which, the indication of the maximum water depth with the hour hand 61 can be switched to indication of a maximum water depth in the diving mode of the day, or can be switched to indication of a maximum water depth in the past.

While the water depth indication mode is performed, when the user presses the A button 5, the mode switches to the diving time indication mode. In other words, the diving time indication mode and the water depth indication mode that are modes for indicating diving information, are alternately switched, when the A button 5 is pressed.

While the diving time indication mode or the water depth indication mode is performed, when the user presses the B button 6, the mode switches to time indication mode, and as illustrated by the electronic watch 1B at right in FIG. 10, the hand position controlling unit 23 points the battery residual amount gauge 72 with the sub-hand 64, and indicates current time with the hour hand 61, the minute hand 62, and the seconds hand 63.

While the time indication mode is performed, when the user presses the A button 5, the mode switches to the diving time indication mode, and the hand position controlling unit 23 indicates diving time with the hour hand 61, the minute hand 62, and the seconds hand 63. In other words, operation of the B button 6 switches the mode in which the diving information is indicated to the time indication mode, and when the A button 5 is pressed in the time indication mode, the mode switches to the diving time indication mode being an initial indication mode of the diving information.

Note that, although FIG. 10 is an indication example of the diving information in the diver mode, when the snorkeling mode is set and the mode is switched to the diving time indication mode, the hand position controlling unit 23 points the graduation ST with the sub-hand 64, and points the graduation SH with the sub-hand 64, when the mode is switched to the water depth indication mode.

The rest of the configuration is similar to that of the first embodiment, and an explanation thereof will be omitted.

Advantageous Effects of Second Embodiment

The electronic watch 1B can achieve similar effects to those of the first embodiment. Furthermore, in the diving mode, the diving time indication mode and the water depth indication mode can be switched, so that diving time can be indicated with the hour hand 61, the minute hand 62, and the seconds hand 63, and even when diving time reaches or exceeds one hour, the user can easily grasp diving time. Furthermore, in the water depth indication mode, in addition to current water depth indication with the minute hand 62, a maximum water depth can be indicated with the hour hand 61, thus more information regarding water depth can be indicated, and user convenience can be improved. For example, the user can easily determine a diving state, by grasping a current water depth with respect to a maximum water depth.

Switching to the diving time indication mode or the water depth indication mode for indicating diving information is performed by the A button 5, switching to the time indication mode is performed by the B button 6, and switching from the time indication mode to the diving time indication mode is performed by the A button 5, thus the user can easily grasp that diving information can be indicated by pressing the A button 5, and time can be indicated by pressing the B button 6, and operability can be improved.

The sub-dial 3B is provided with four types of graduations indicating a combination of the diving mode type, that is, the diver mode or the snorkeling mode, and the type of diving information, that is, diving time or a water depth, and the sub-hand 64 points the graduation, so that the user can easily grasp a type of information indicated by the hour hand 61, the minute hand 62, and the seconds hand 63.

Also, in the time indication mode, the sub-hand 64 points the battery residual amount gauge 72, so the user can easily grasp that current time is indicated with the hour hand 61, the minute hand 62, and the seconds hand 63.

Modified Example of Second Embodiment

In the electronic watch 1B, the two buttons, that is, the A button 5 and the B button 6 are used to switch between the three types of indication modes, that is, the diving time indication mode, the water depth indication mode, and the time indication mode, but the switching may be performed only with one of the buttons.

For example, a configuration may be adopted in which, an initial mode when the mode transits to the diving mode is the diving time indication mode, and when the A button 5 is pressed during the diving time indication mode, the mode switches to the water depth indication mode, when the A button 5 is pressed during the water depth indication mode, the mode switches to the time indication mode, and when the A button 5 is pressed during the time indication mode, the mode switches to the diving time indication mode. In this case, the three types of modes can be switched by simply pressing the A button 5, so operability at the time of switching can be improved. Note that, as in the second embodiment, when switching each the mode, the graduation pointed by the sub-hand 64 switches.

Other Exemplary Embodiments

Note that the present disclosure is not limited to each of the embodiments described above, and variations, modifications, and the like within the scope in which the object of the present disclosure can be achieved are included in the present disclosure.

Figure 11:
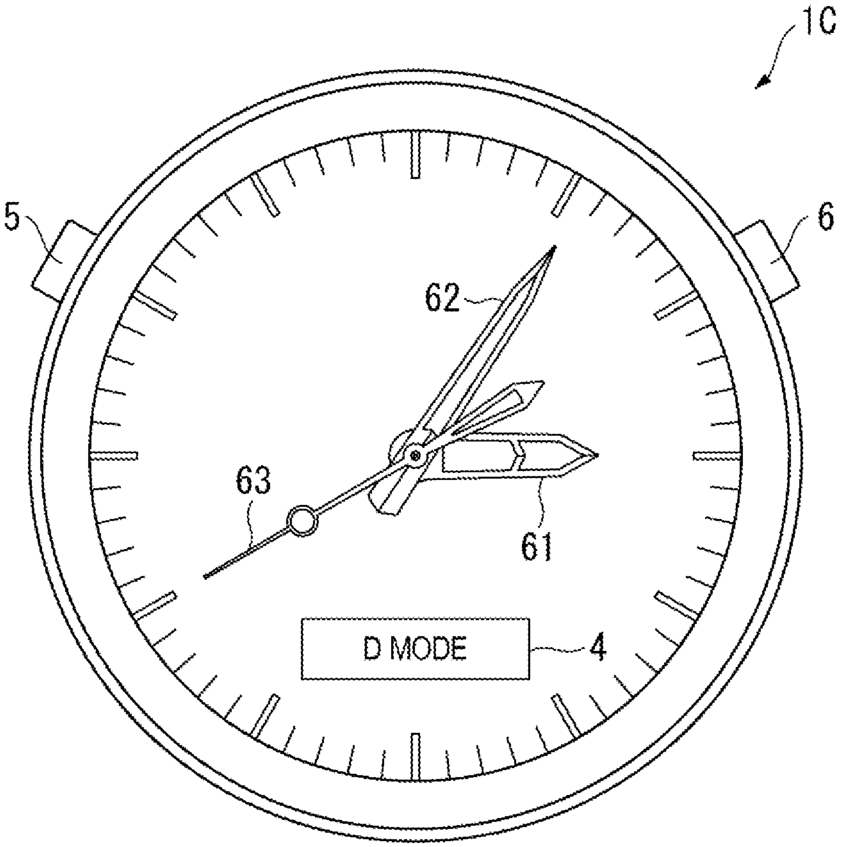
FIG. 11 is a front view illustrating an electronic watch according to a modified example.

For example, as in an electronic watch 1C illustrated in FIG. 11, a digital display unit 4 using an organic EL display, a liquid crystal display, or the like, may be provided, and an indication mode indicating a type of information indicated by the hour hand 61, the minute hand 62, and the seconds hand 63 may be displayed on the digital display unit 4.

For example, when the digital display unit 4 is provided in place of the sub-dial 3A and the sub-hand 64, in the electronic watch 1 according to the first embodiment, it is sufficient that the "D mode" or the "S mode" is displayed on the digital display unit 4. Additionally, when the digital display unit 4 is provided in place of the sub-dial 3B and the sub-hand 64, in the electronic watch 1B according to the second embodiment, it is sufficient that a "DT mode", a "DH mode", an "ST mode", or an "SH mode" is displayed on the digital display unit 4.

In the electronic watch 1C, necessity of the sub-dials 3A, 3B and the sub-hand 64 can be eliminated, so the fourth motor driving circuit 34, the fourth motor 44, and the fourth train wheel 54 can also be eliminated, which makes it easier to achieve miniaturization and thinning of the electronic watch 1C.

Note that, in the electronic watch 1C, in a normal mode before transiting to a diving mode or a pre-diving mode, or in a time indication mode to which the mode is switched by a button operation in the diving mode, a battery residual amount may be displayed on the digital display unit 4, or display of the digital display unit 4 may be turned off.

In each of the above-described embodiments, the pre-diving mode is provided, but a configuration may be adopted in which the pre-diving mode is not provided, and the mode directly switches from the normal mode to the diving mode.

In addition, in each of the above-described embodiments, the diver mode and the snorkeling mode are provided as the diving modes, but it is also possible to provide only the diver mode.

In the embodiment described above, the water detection sensor 12 is provided, and the pressure sensor 11 is operated when entrance into water is detected by the water detection sensor 12, but a configuration may also be adopted in which only the pressure sensor 11 is provided without providing the water detection sensor 12. Note that, when only the pressure sensor 11 is provided, since the pressure sensor 11 is constantly operated, power consumption increases, and thus, for example, in an electronic watch provided with only a diver mode, by setting an operating interval of the pressure sensor 11 to be long, for example, five minute intervals, until a pressure corresponding to a water depth 1.5 m is applied, and setting the operating interval of the pressure sensor 11 to be short such as every one second, when it can be estimated that the water depth reaches or exceeds 1.5 m, the power consumption may be reduced.

When a battery voltage is measured in the diving mode, and the battery voltage drops below a threshold value, by performing two-second movement for the seconds hand 63, that is, by moving the seconds hand 63 by an amount corresponding to two seconds every two seconds, the user may be notified of the drop in battery voltage. This two-second movement may be performed not only when seconds of diving time is indicated with the seconds hand 63, but also when the A button 5 is pressed to indicate seconds of current time.

The scale of the graduations for the hour hand 61 and the minute hand 62 indicating a water depth is not limited to the example of the above embodiment. For example, in the snorkeling mode, a scale may be set as 2.5 cm per one graduation (one minute) such that 2.5 cm×60 minutes=1.5 m when the hour hand 61 rotates 360°. In this case, by adopting a configuration in which when 1.5 m is reached the mode transits to the diver mode, the hour hand 61 does not circles more than once during the snorkeling mode, and it is easy for the user to grasp switching of the diving mode and a water depth.

What is claimed is:

1. An electronic watch, comprising:
an hour hand;
a first motor configured to move the hour hand;
a minute hand;
a second motor configured to move the minute hand;
a seconds hand;
a third motor configured to move the seconds hand;
a first motor driving circuit configured to drive the first motor;
a second motor driving circuit configured to drive the second motor;
a third motor driving circuit configured to drive the third motor;
a pressure sensor configured to measure a pressure; and
a controller configured to:
estimate a water depth based on the measured pressure;
detect start of first diving when the water depth corresponding to the measured pressure exceeds a first threshold;
detect start of second diving when the water depth corresponding to the measured pressure exceeds a second threshold, the second threshold corresponding to a deeper water depth than the first threshold;
initiate counting of a diving period of time when the start of second diving is detected;
control a position of one of the hour hand or the minute hand to a first position indicating the water depth after the start of second diving is detected;
control a position of the other of the hour hand or the minute hand to a second position indicating the diving period of time after the start of second diving is detected; and
control a position of the seconds hand to a third position indicating either seconds of current time or seconds of the diving period of time after the start of second diving is detected.

2. The electronic watch according to claim 1, further comprising a water detection sensor,
wherein, when the water detection sensor detects that the electronic watch entered water, the controller is configured to cause the pressure sensor to start measurement of the pressure.

3. The electronic watch according to claim 2,
wherein, when the controller initiates the counting of the diving period of time, the controller is configured to control the position of one of the hour hand or the minute hand to a 12 o'clock position as the second portion and move the one of the hour hand or the minute hand in association with the counting of the diving period of time.

4. The electronic watch according to claim 2,
wherein the hour hand indicates the water depth, and the minute hand indicates the diving period of time.

5. The electronic watch according to claim 1,
wherein, when the controller initiates the counting of the diving period of time, the controller is configured to control the position of one of the hour hand or the minute hand to a 12 o'clock position as the second position and move the one of the hour hand or the minute hand in association with the counting of the diving period of time.

6. The electronic watch according to claim 5,
wherein the hour hand indicates the water depth, and the minute hand indicates the diving period of time.

7. The electronic watch according to claim 1, comprising:
an indicator hand;
a fourth motor configured to drive the indicator hand; and
a fourth motor driving circuit configured to drive the fourth motor,
wherein, when the controller detects the start of second diving, the controller is configured to control a position of the indicator hand to a fourth position indicating a diving mode, and
when the controller does not detect the start of second diving, the controller is configured to control the position of the indicator hand to a fifth position indicating a battery residual amount.

8. The electronic watch according to claim 1, further comprising a digital display configured to indicate that a diving mode is set when the controller detects the start of second diving.

9. The electronic watch according to claim 1, further comprising an operation interface operable by a user,
wherein, when the controller detects an operation of the operation interface while the diving period of is indicated, the controller is configured to control the hour hand and the minute hand to indicate the current time, and
when a certain period of time elapses after indicating the current time, the water depth and the diving period of time are indicated by the hour hand and the minute hand.

10. The electronic watch according to claim 1, further comprising an operation interface operable by a user,
wherein, when the controller detects an operation of the operating interface while the diving period of time is indicated, the controller is configured to control one of the hour hand or the minute hand to indicate the water depth and control the other of the hour hand or the minute hand to indicate a maximum water depth.

11. The electronic watch according to claim 10,
wherein, when the controller detects the operation of the operating interface while indicating the water depth and the maximum water depth by the hour hand and the minute hand, the controller is configured to control the hour hand and the minute hand to indicate the current time.

12. The electronic watch according to claim 1,
wherein the hour hand indicates the water depth, and the minute hand indicates the diving period of time.

13. A method for controlling an electronic watch for causing a controller to execute a process, the method comprising executing on the controller the steps of:
moving an hour hand via a first motor and a first motor driving circuit;
moving a minute hand via a second motor and a second motor driving circuit,
moving a seconds hand via a third motor and a third motor driving circuit;
measuring a pressure via a pressure sensor;
detecting start of diving based on the measured pressure;
estimating a water depth based on the measure pressure;
detecting start of first diving when the water depth corresponding to the measured pressure exceeds a first threshold;
detecting start of second diving when the water depth corresponding to the measured pressure exceeds a second threshold, the second threshold corresponding to a deeper water depth than the first threshold;

initiating of counting a diving period of time when the start of second diving is detected, controlling a position of one of the hour hand or the minute hand to a first position indicating the water depth after the start of second diving is detected;

controlling a position of the other of the hour hand or the minute hand to a second position indicating the diving period of time after the start of second diving is detected; and controlling a position of the seconds hand to a third position indicating either seconds of current time or seconds of the diving period of time after the start of second diving is detected.

* * * * *